United States Patent
Jiang et al.

(10) Patent No.: US 8,018,910 B2
(45) Date of Patent: Sep. 13, 2011

(54) METHOD AND DEVICE FOR TRANSFERRING MULTI-STANDARD RADIO SERVICE DATA

(75) Inventors: Yajun Jiang, Guangdong (CN);
Xiaochuan Guo, Guangdong (CN);
Yingjiu Xia, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 753 days.

(21) Appl. No.: 11/577,727

(22) PCT Filed: Dec. 15, 2006

(86) PCT No.: PCT/CN2006/003431
§ 371 (c)(1),
(2), (4) Date: Apr. 23, 2007

(87) PCT Pub. No.: WO2007/090330
PCT Pub. Date: Aug. 16, 2007

(65) Prior Publication Data
US 2009/0092117 A1    Apr. 9, 2009

(51) Int. Cl.
*H04B 7/216*    (2006.01)

(52) U.S. Cl. ........ 370/342; 370/466; 370/468; 370/506; 370/395.43

(58) Field of Classification Search .................. 370/466, 370/342, 468, 506, 395.43
See application file for complete search history.

(56) References Cited

U.S. PATENT DOCUMENTS

| | | | |
|---|---|---|---|
| 7,571,338 B2 * | 8/2009 | Osterling et al. | 713/500 |
| 7,602,751 B2 * | 10/2009 | Ebert et al. | 370/335 |
| 2005/0105534 A1 * | 5/2005 | Osterling | 370/395.43 |
| 2005/0105552 A1 * | 5/2005 | Osterling | 370/466 |
| 2005/0107124 A1 * | 5/2005 | Osterling et al. | 455/561 |

FOREIGN PATENT DOCUMENTS

| | | |
|---|---|---|
| CN | 1486098 | 3/2004 |
| CN | 1859661 | 11/2006 |
| WO | WO 2005-029713 | 3/2005 |

OTHER PUBLICATIONS

"CPRI Specification V2.0 (Oct. 1, 2004)" 2004. *Common Public Radio Interface(CPRI): Interface Specification.* http://www.cpri.info/spec.html.
OBSAI: "Reference Point 3 Specification Version 1.0." Feb. 5, 2004. *Open Base Station Architecture Initiative.*
Written Opinion of the International Searching Authority in related PCT Application No. PCT/CN2006/003431, dated Apr. 5, 2007, in English Translation.
European Communication pursuant to Article 94(3) EPC for Application No. 07 002 432.8-2416, dated Apr. 16, 2008.

* cited by examiner

*Primary Examiner* — Jinsong Hu
*Assistant Examiner* — Qun Shen
(74) *Attorney, Agent, or Firm* — Finnegan, Henderson, Farabow, Garrett & Dunner LLP (57) ABSTRACT

The embodiments of the present invention relate to a method and a device for transferring radio service data. The method includes: designing a radio service frame timing mechanism and/or a rule of filling IQ data for a plurality of standards; configuring frame timing mechanisms corresponding to various services according to the designed radio service frame timing mechanism and/or the rule of filling IQ data for a plurality of standards; and transmitting multi-standard radio service data according to the configured frame timing information and/or methods of mapping IQ containers. The device includes a determination unit, a configuring unit and a transfer unit. Thus, uniform transmission of radio IQ data and frame synchronization for different standards may be enabled via a common radio interface between a Radio Equipment Controller (REC) and a Radio Equipment (RE).

10 Claims, 4 Drawing Sheets

Figure 6

METHOD AND DEVICE FOR TRANSFERRING MULTI-STANDARD RADIO SERVICE DATA

This application claims priority to Chinese Patent Application No. 200610023754.4, filed with the Chinese Patent Office on Feb. 6, 2006, entitled "Method for Transferring Multi-standard Radio Service Data via common radio interface", contents of which are incorporated herein by reference in its entirety.

FIELD OF THE INVENTION

The present invention relates to the field of mobile communication technologies, and more particularly to a method and a device for transferring multi-standard radio service data via a common radio interface.

BACKGROUND OF THE INVENTION

The Common Public Radio Interface (CPRI) specification is published together by several companies which co-operate in the CPRI industry for the key internal interface in a radio base station for mobile communications. This CPRI specification is the first common specification in connection with the key interface, and provides a set of common standards for the key internal interface in the base station. The CPRI is responsible for defining the key internal interface in the radio base station between a Radio Equipment Controller (REC) and a Radio Equipment (RE). Here, the REC includes a baseband processing element and the RE includes a Radio Frequency (RF) processing element. This standard has been established for the purpose of creating an open market orientated to cellular base stations, and thereby greatly reducing enormous development labors and high costs conventionally concomitant throughout the design of a base station.

The CPRI industry cooperation focuses on a design for a base station of a $3^{rd}$ Generation (3G) mobile communication system, and this design divides the radio base station into a radio part and a control part by specifying such a new interface which is the interconnection point internal to the base station only and uniquely driven by radio. This allows each part of the base station better benefit from the technology evolution in its respective area. The CPRI specification is openly available for the benefit of the wireless industry. Key benefits for network operators are the availability of a wider portfolio of radio base station products and the adaptability to all deployment scenarios with a shorter time to market. In addition to this, the CPRI specification enables base station manufacturers and component providers to focus their research and development efforts on their core competencies. The CPRI specification allows for new architectures and is not limited by module dimensions or a predefined function split.

In addition to focus the base station manufactures' research and development efforts on their core competencies, the CPRI industry cooperation also gives rise to equipments manufactured by different vendors. The CPRI specification brings the primary benefits in that it allows newly introduced technologies to evolve more rapidly, and enables the base station manufacturers to provide the operators a wider portfolio of products and to introduce their products into the market in a shorter period. Meanwhile, the operators may benefit from wider product options, more flexible solutions and an improved efficiency of network deployments.

The founders of the CPRI initiate a competitive mobile network component industry, and benefit the entire wireless industry by making the CPRI available openly. The CPRI is a complementary to existing standardization organizations, such as the $3^{rd}$ Generation Partnership Project (3GPP), and its developed common interface may be applied to radio base station products of mobile systems.

For a 3G mobile communication system, such as a Wideband Code Division Multiple Access (WCDMA) system, the CPRI specification may be adapted to implement Layer 1 (L1) and Layer 2 (L2) communication protocols between a baseband control element and an RF element. Based on the CPRI specification, the commonality of the interface between the baseband control element and the RF element may be enhanced, and it is also advantageous for the interconnection between the baseband unit and the radio frequency unit from various vendors. Subsequent to the successful introduction of the CPRI, an issue in urgent need of being addressed at present is how to update and enhance the systematic architecture and the networking mode of 3G radio base stations. For a common interface between the baseband unit and the RF unit, both a systematic architecture and a networking mode need to be proposed accordingly for making full use of its advantages. In addition, a solution to network transport reliability needs to be provided based on the systematic architecture. It is also required to ensure the integrity, compatibility and reliability of a base station system in the case of the common interface architecture and the coordination between apparatuses from different vendors.

It may be seen from the evolutions of the $2^{nd}$ Global System of Mobile Communication (GSM) and the WCDMA that a base station experiences a great renovation every four to five years. Furthermore, thanks to rapid developments of computing and microelectronic technologies, the regeneration of mobile communication technologies will be increasingly rapid. During the evolution of various phases, various radio standards emerge constantly and will exist concurrently, such as the $2^{nd}$ GSM, the $3^{rd}$ WCDMA, the CDMA2000, the Time Division-Synchronous Code Division Multiple Access (TS-CDMA), the Worldwide Interoperability Microwave Access (WiMAX) of the 802.16d and 802.16e from the Institute of Electrical and Electronic Engineers (IEEE), etc. As a common radio interface in the industry the CPRI must be adapted to a common transmission for various standards, thus embodying the connotation of the so-called common interface.

The organizations of radio frame timing and radio frame number as well as data rate are different for different radio standards in different phases. The radio frame timing identifies a signal that indicates the start of a period for a radio frame from a radio base station. Different radio standards are usually provided with different frame periods, for example, a frame period of 10 ms (millisecond) for the WCDMA R6 and the earlier versions, a frame period of 60/13 ms for the GSM, and numerous options, including 2 ms, 5 ms and the like, of a frame period for the 802.16e, etc. The radio frame number refers to a serial number of a radio frame. Different standards are provided with different methods for identifying the radio frame number and with different numbers of binary bits, for instance, a 12-bit radio frame number for the WCDMA R6 and earlier versions, and a more complex one for the GSM.

The radio data generally refer to a data flow of two components, i.e. In-phase/Quadrature (IQ), after a modulation. Thus, the user plane data from the REC to the RE and that from the RE to the REC may be transferred in the form of IQ data. Typically, IQ data are transported in an IQ container, also known as an Antenna xCarrier (AxC) container in the CPRI (see the CPRI specification for more details), which will be directly referred to as an IQ container for convenient understanding.

For the radio IQ data of specific standards, an IQ container mapping shall be enabled in view of different data rates for the standards. A primary one of the factors, which has influence upon the complexity for mapping the IQ data into a CPRI IQ container in different standards, is the standard rate of various standards. For the CDMA scheme, the standard rate refers to a chip rate (3.84 MHz for the WCDMA, 1.2288 MHz for the CDMA 2000 and 1.28 MHz for the TD-SCDMA); for the GSM, the standard rate refers to a symbol rate of $13/48$ MHz; and for the WiMAX, the standard rate refers to a sampling frequency, for which there are numerous options available, as illustrated in Table 1. Note that the standard rate is not a naming common to the industry, but as used here is an assumed concept in general for a description of various standards. Moreover, a standard period is defined as an inversion of the standard rate, which refers to a chip period for the CDMA, a symbol period for the GSM, and a sampling period for the WiMAX.

TABLE 1

Overview of 16d/e Baseband Frequencies

| Channel Bandwidth (MHz) | Sampling Rate (MHz) | Number of Multiplexing (n) |
| --- | --- | --- |
| 1.75/3.5/7/14/28 | 2.0/4.0/8.0/16.0/32.0 | 8/7 |
| 1.5/3/6/12/24 | 1.72/3.44/6.88/13.76/27.52 | 86/75 |
| 1.25/2.5/5/10/20 | 1.44/2.88/5.76/11.52/23.04 | 144/125 |
| 2.75/5.5/11/22 | 3.16/6.32/12.64/25.28 | 316/275 |
| 2.0/4/8/16/32 | 2.28/4.56/9.12/18.24/36/48 | 57/50 |
| Others | / | 8/7 |

As a common interface standard used between the REC and RE, the CPRI serves to provide a method for transferring various standards of radio IQ data. The latest version of the CPRI, i.e., V2.0, is designed for the WCDMA R6 and the earlier standards, and hence is neither suitable for other standards such as the IEEE 802.16e, the GSM, etc., nor possibly even for subsequent WCDMA versions such as the WCDMA R7, etc. To adapt to the technology advancements in the mobile communication industry, a common radio interface is urgently needed for convenient and efficient transfer of multi-standard radio service data.

SUMMARY OF THE INVENTION

An embodiment of the invention is to provide a method for transferring multi-standard radio service data, so that uniform transmission of radio service data (e.g. IQ data) and frame synchronization for different standards may be realized via a common radio interface.

Another embodiment of the invention is to provide a device for transferring multi-standard radio service data, so that uniform transmission of radio service data (e.g. IQ data and frame synchronization for different standards may be realized via a common radio interface.

To this end, the method for transferring multi-standard radio service data provided in an embodiment of the invention may include:

designing a radio service frame timing mechanism and/or a rule of filling IQ data for a plurality of standards;

configuring frame timing information and/or methods of mapping IQ containers corresponding to various services of radio equipments, according to the designed radio service frame timing mechanism and/or the rule of filling IQ data for a plurality of standards; and transferring multi-standard radio service data according to the configured frame timing information and/or methods of mapping IQ containers.

The device for transferring multi-standard radio service data provided in another embodiment of the invention may include:

a designing unit, adapted to design a radio service frame timing mechanism and/or a rule of filling IQ data for a plurality of standards;

a configuring unit, adapted to configure frame timing information and/or methods of mapping IQ containers corresponding to various services, according to the radio service frame timing mechanism and/or the rule of filling IQ data for a plurality of standards designed by the designing unit; and a transfer unit, adapted to transfer multi-standard radio service data according to the frame timing information and/or the methods of mapping IQ containers corresponding to various services, configured by the configuring unit.

The embodiments of the invention may provide uniform transmission of multi-standard radio data between an REC and an RE (or between other electronic equipments) via a common radio interface; a control channel of the interface is configured uniformly, and the REC and the RE may negotiate about and inform the opposite end of types of its borne radio standards and of the standard in use. In this way, uniform IQ data transmission and frame synchronization may be enabled independent of specific types of standards. That is, the common interface may be enabled to transmit data at any standard rate, and the CPRI standard may be extended to support other various standards, thereby greatly enhancing the universality of the existing CPRI.

DETAILED DESCRIPTION OF THE EMBODIMENTS

In the prior art, in view of the development of radio communications, it is tended to separate the REC from the RE of the base station physically and thus to enable independent developments of the REC and the RE. An interface between the REC and the RE may be defined with a standard protocol or with a manufacturer-defined protocol. The CPRI is such a standard for such an interface. However, the current CPRI V2.0 is only applicable to the WCDMA R6 and the earlier versions, and not applicable to any standard other than these.

The CPRI V2.0 has been defined for the WCDMA, and is applicable to the WCDMA R6 and the earlier versions. A basic frame rate as defined in the CPRI standard is the chip rate of the WCDMA (3.84 MHz), and the IQ data rate of WCDMA CPRI is an integer multiple of the WCDMA chip rate. Therefore, WCDMA IQ data may be easily borne by the CPRI IQ container.

Figure 1:
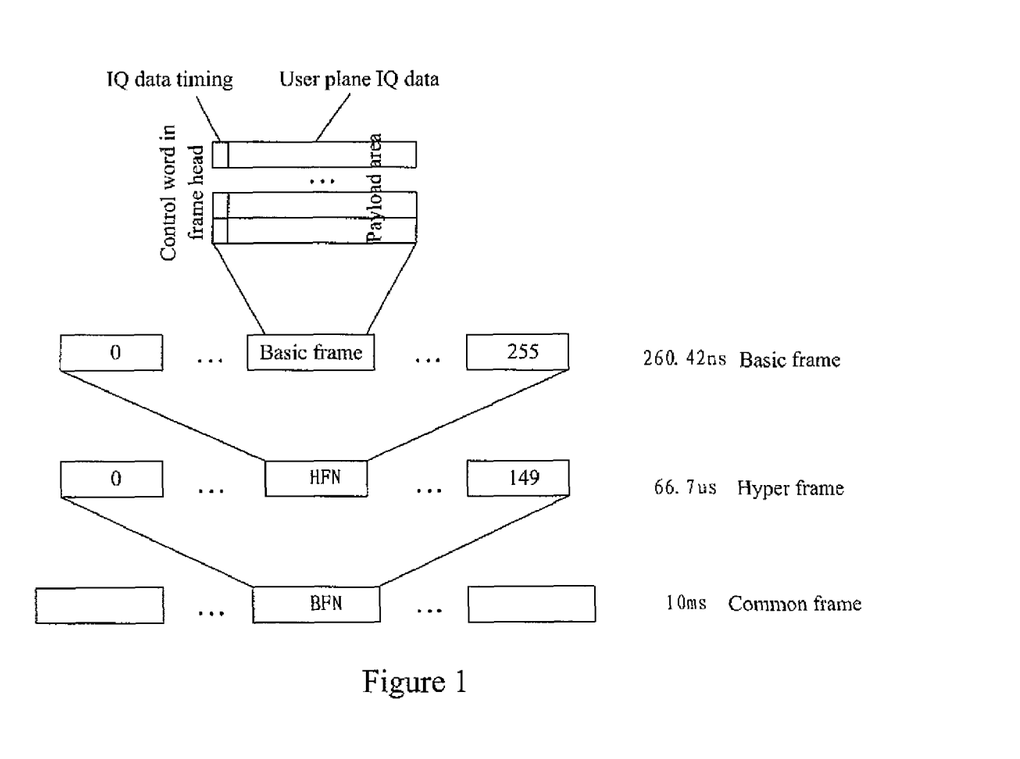
FIG. 1 is a schematic diagram illustrating the principle of transferring a WCDMA R6 data frame as well as frame synchronization according to the CPRI V2.0 in the prior art.

FIG. 1 is a schematic diagram illustrating the basic principle for transferring WCDMA IQ data via the CPRI V2.0 interface in the prior art. In the case that the line bit rate of the CPRI is 1.2288 Gbps, the IQ container for every basic frame is 15×16=240 bits in size. Assume that the sampling multiple of WCDMA uplink IQ data is two times, the bit width of the uplink IQ data is 12 bits, the number of uplink antennas is two, and the number of carriers is four. Then, 192 bits (12 (bits)×2 (I and Q)×2 (the sampling multiple)×2 (the number of antennas)×2 (the number of carriers)) of data need to be transmitted during each chip (i.e. the period of each CPRI basic frame). In the case that the frame head of each basic frame carries timing information corresponding to the IQ data carried in the payload area of that basic frame, this timing information is provided in Hyper Frame Number (HFN) and Node B Frame Number (BFN) fields as defined in the CPRI, wherein the BFN is a Node B Frame Number as defined in the WCDMA. That is, the 192-bit uplink data may be put into a 240-bit IQ container of an uplink CPRI basic frame, and its corresponding tinning information may be put into the frame head. In this regard, a synchronization relationship of the timing information and/or of the IQ data shall be taken into account upon assembling and dissembling of the frames.

Obviously, due to the special frame construction of the CPRI V2.0, the IQ chip data rate and the CPRI frame rate are basically matched with each other for bearing IQ data of the WCDMA R6. Thus, frame synchronization may be achieved simply through control words such as the BFN without designing the IQ container mapping.

In practical applications, there may be the following issues in the above solution. In the case that the CPRI standard is extended for supporting another standard while keeping the line bit rate and the frame structure of the CPRI unchanged, the mapping of IQ data may not be as simple as that in the WCDMA. Since between a standard rate and the rate of the CPRI basic frame is not a simple relationship of a multiple, the mapping of IQ data of different standards will be more complex than that of the WCDMA into the CPRI. However, the existing radio data transmission architecture of the CPRI V2.0 may enable neither transmission nor frame synchronization for IQ data of other standards, especially simultaneous transmission of radio IQ data of various frame standards. In this regard, the current CPRI V2.0 has been designed mainly for the WCDMA R6, and neither its common-frame length nor its control-word structures may be applied to IQ data of other standards. Especially, an absence of matching between standard rates results in disadvantages to, for instance, the frame synchronization, the IQ container mapping, etc. As an example, the CPRI 2.0 supports only an IQ data rate which is an integer multiple of 3.84 and supports only a timing frame synchronization for a frame period such as 1/(3.84 MHz), 10 ms, etc., but fails to support IQ data rates or frame synchronization other than these.

In view of this, embodiments of the invention provide a method and a device for transferring multi-standard radio service data, so that uniform transmission of radio service data (e.g. IQ data) and frame synchronization for different standards may be realized via a common radio interface.

The method for transferring multi-standard radio service data provided in an embodiment of the invention may include: designing a radio service frame timing mechanism and/or a rule of filling IQ data for a plurality of standards; configuring frame timing information and/or methods of mapping IQ containers corresponding to various services of radio equipments, according to the designed radio service frame timing mechanism and/or the rule of filling IQ data for a plurality of standards; and transferring multi-standard radio service data according to the configured frame timing information and/or methods of mapping IQ containers.

The device for transferring multi-standard radio service data provided in another embodiment of the invention may include: a designing unit, adapted to design a radio service frame timing mechanism and/or a rule of filling IQ data for a plurality of standards; a configuring unit, adapted to configure frame timing information and/or methods of mapping IQ containers corresponding to various services, according to the radio service frame timing mechanism and/or the rule of filling IQ data for a plurality of standards designed by the designing unit; and a transfer unit, adapted to transfer multi-standard radio service data according to the frame timing information and/or the methods of mapping IQ containers corresponding to various services, configured by the configuring unit.

The invention will be further described with reference to the drawings and embodiments thereof.

In order to transmit radio frames of one or more standards via a single common radio interface, service frames with different frame lengths shall be borne by a uniform basic frame, and a key point for that is how to realize frame timing and transfer frame number and/or how to fill IQ data into a common frame. Due to the variations of frame lengths and standards, the prior synchronization mechanism and frame number transmission depending on the basic frame may enable neither frame synchronization and frame timing of different standards nor IQ data filling with the same data rate. Therefore, an embodiment of the invention proposes that a radio service frame timing mechanism and/or a rule of filling IQ data for a plurality of standards may be designed; corresponding frame timing information and/or methods of mapping IQ containers may be configured for various services according to the designed multi-standard radio service frame timing mechanism and/or IQ data filling rule; and finally, multi-standard radio service data may be transmitted according to the configured frame timing information and/or the methods of mapping IQ containers.

To implement the transmission of multi-standard radio service data, an embodiment of the invention proposes a common and uniform configuration scheme independent of specific standards. An REC may configure various services of electronic communication equipments (such as Radio Equipments (REs), which will be used hereinafter as an example, but the invention shall not be limited thereto) with methods of mapping IQ containers and a frame timing mechanism (i.e. frame timing information), both of which may be designed according to a demand for service processing and an operator-predefined condition. That is, the various services may be borne by the REs, and the method of mapping IQ containers and the frame timing mechanism possibly varies from one service to another of each RE, but keeps fixed for the same service of that RE.

Also, according to the embodiments of the invention, the configured frame timing mechanism is a frame timing mechanism for service frames, that is, to recover the frame timing information of the radio frames of a specific standard according to uniform timing information. Accordingly, a receiver may recover the frame timing information of the service frames of the specific standard according to the received uniform timing information, thereby achieving the purpose of transferring multi-standard radio services.

Additionally, in the case of transmission between an upper-stage RE and a lower-stage RE in a cascade connection of REs, a transparent transmission mechanism in terms of interface plane may be employed according to an embodiment of the invention, that is, transparent transmission between the REs does not involve the processing of methods of mapping IQ container or service frame synchronization. According to the embodiments of the invention, the same design is applied for the methods of mapping IQ containers on both uplink and downlink channels. On the other hand, for the frame timing on uplink and downlink channels, as for downlink channel, the REC may transmit according to a frame timing rule, and the REs may recover frame timing according to the same information, so as to achieve the frame synchronization; and as for uplink channel, the REC may recover the frame timing received over the uplink channel according to the frame timing information at the transmitting time of the downlink channel as well as a fixed processing delay and a transmission delay.

Figure 2:
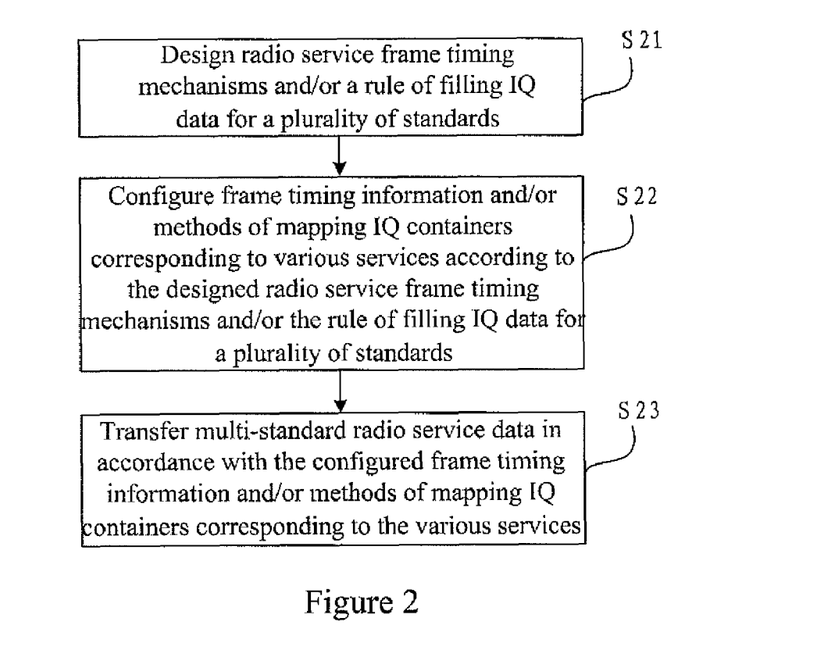
FIG. 2 is a flow chart of a method for transferring multi-standard radio service data according to an embodiment of the invention.

FIG. 2 illustrates a flow chart of the method for transferring multi-standard radio services based on a CPRI common radio interface according to an embodiment of the invention. The method may include the following steps.

In step S21, a radio service frame timing mechanism and/or an IQ data filling rule for a plurality of standards are designed.

In step S22, corresponding frame timing information and/or IQ container mapping methods are configured for various services according to the designed radio service frame timing mechanism and/or filling IQ data rule for a plurality of standards.

In step S23, multi-standard radio service data are transmitted according to the configured frame timing information and/or IQ container mapping methods corresponding to various services.

Figure 3:
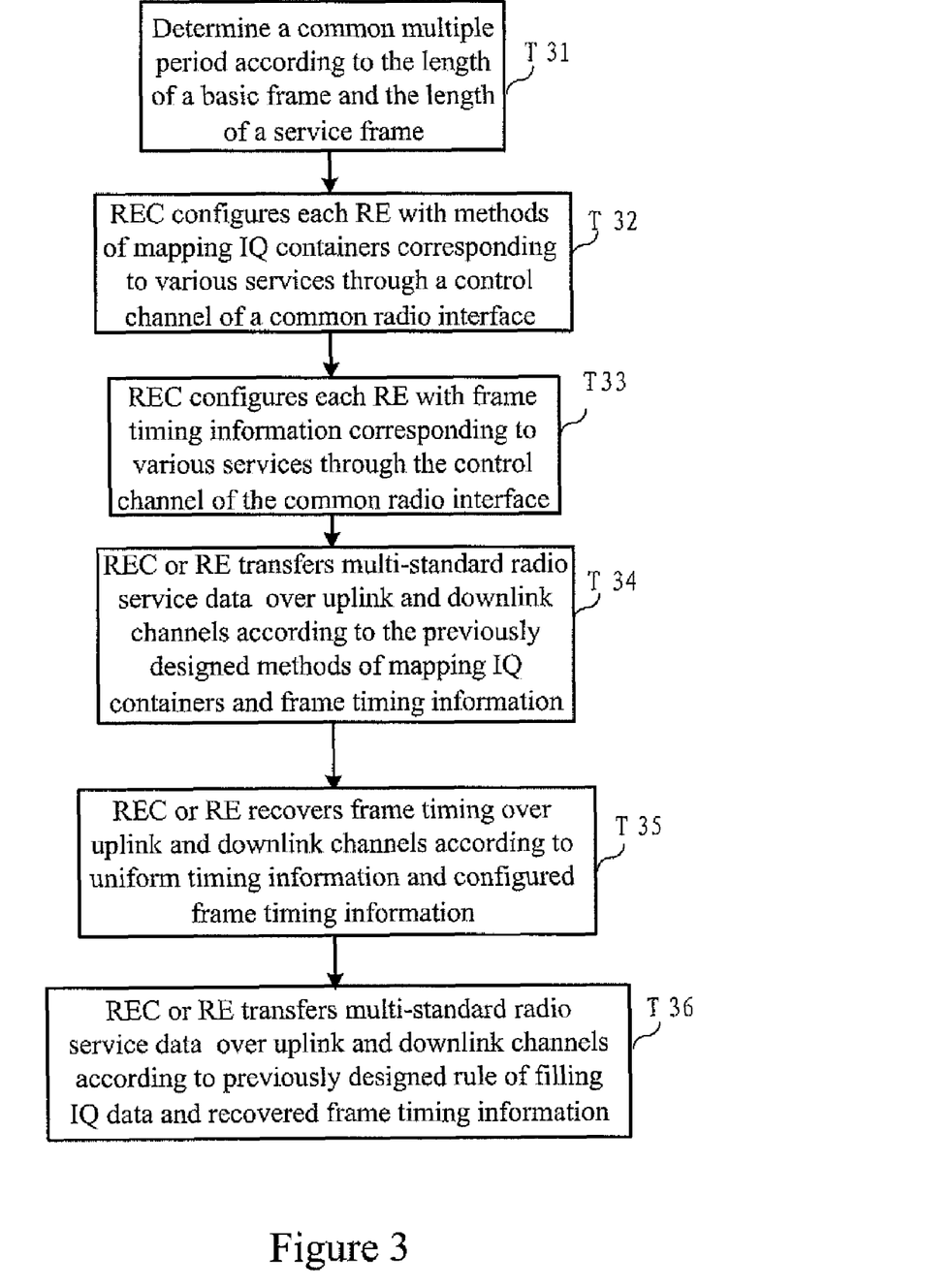
FIG. 3 is a schematic diagram illustrating the principle of frame timing based upon a common multiple period in the method for transferring multi-standard radio service data according to an embodiment of the invention.

According to this embodiment, based upon the CPRI V2.0, control words may be extended for transmission of multi-standard radio data. A key point for this lies in that the transmission may be enabled in unit of a common multiple period, and REs may be configured through a control channel for the purpose of uniform transmission for various standards, a specific implement for which is illustrated in FIG. 3.

In step T31, a common multiple period is determined. The common multiple period may be determined according to a lowest common multiple relationship of the length of a basic frame and the length of a service frame, so as to be equal to an integer (N) multiple of the length of the basic frame or an integer (M) multiple of the length of the service frame, and each N consecutive basic frames are taken as a basic frame set to bear the IQ data of each M service frames.

Total M standard periods of radio standard data may be transmitted through N CPRI basic frames, wherein M and N may be determined in such a way that they are both integers, and have no common divisor, or M/N=f1/f0, where f1 is a standard rate and f0 is a rate of a CPRI basic frame (3.84 MHz). Table 2 illustrates several examples for values of M and N corresponding to different standard rates of commonly used radio service standards, such as the WCDMA, the GSM, the WiMAX, etc. Hereinafter, the N basic frames used to transferring the total M standard periods of data will be referred to as "a basic frame set".

TABLE 2

Values of M and N Corresponding to Different Standard Rates

| Standard Rates (MHz) | The Number of Service Frames M | The Number of Basic Frames N |
|---|---|---|
| 2 | 25 | 48 |
| 1.4 | 35 | 96 |
| 1.68 | 7 | 16 |
| 2.24 | 7 | 12 |
| 3.08 | 77 | 96 |
| 1.2288 | 8 | 25 |
| 1.28 | 1 | 3 |
| 3.84 | 1 | 1 |
| 13/48 | 325 | 4608 |

In step T32, through a control channel of the common radio interface, the REC configures respective REs with methods of mapping IQ containers corresponding respective services. Here, the method of mapping IQ containers refers to the specifically determined method of mapping IQ service data into IQ containers according to an IQ data filling rule given in the embodiment of the invention, including mapping parameters, mapping synchronization relationship and arrangements of IQ data in respective basic frames. In particular, rules of filling the IQ data of service frames into a basic frame set are designed according to demands for processing and predefined conditions corresponding to respective REs or respective services, and are configured to the respective REs by the REC by means of signaling or control words, through a CPRI control channel. Note that respective services of each RE correspond to fixed rules of filling IQ data or methods of mapping IQ containers, and the filled IQ data shall be aligned with a common multiple period for the purpose of frame synchronization upon obtaining IQ data.

A relatively simple mapping method is to reserve, in the IQ containers of each CPRI basic frame, K bits for each RE for using in the transmission of the IQ data for that RE. We assume that A is the number of the antennas of an RE, C is the number of the carriers of an RE, S is an over-sampling multiple of IQ data transmitted via CPRI, and D is a bit width of each I/Q data. A, S and D may take different values for uplink and downlink. The magnitude of K is dependent upon the allocation of M IQ data within N consecutive basic frames, and the IQ data may be arranged in the basic frames in numerous ways, which is well known to those skilled in the art, and thus will not be further described here. According to an embodiment of the invention, the arrangement of M IQ data within N consecutive basic frames is fixed, that is, the arrangement of IQ data within the $L^{th}$ frame among a cycle of any N consecutive basic frames is the same, wherein L is a positive integer less than N. Furthermore, K may be a fixed value or vary as the IQ data in each basic frame differs.

In step T33, the REC configures each RE with the frame timing information corresponding to various services (i.e. the frame timing mechanism), by means of commands or control words over the control channel of the common radio interface. The system designs the frame timing information of the service frames in the basic frame set according to the uniform timing information, the processing demands and the predefined conditions of respective REs or the uniform timing information, the processing demands and the predefined conditions of various services, and the REC configures the various services of respective REs with the frame timing information by means of signaling or control words through the CPRI control channel. For the services corresponding to respective REs, the configured methods of mapping IQ containers and frame timing mechanism may be identical to or different from each other, but the same service of the same RE shall correspond to fixed frame timing information and/or a fixed method of mapping IQ containers, and the filled IQ data shall be aligned with the uniform timing information.

Respective services of each RE correspond to fixed frame timing information, and the frame timing information shall be based upon a common multiple period, so that the synchronization of the service data of the respective services may be enabled based upon basic frames while attaining synchronization of service frames.

Since a service frame of every standard is generally in the order of milliseconds, and the period of the service frame necessarily includes an integer number of IQ data samples, the starting time of the timing for the service frame corresponds to the starting time of a certain IQ data sample. For instance, the frame timing period for the WCDMA is 10 ms, and includes 38400 IQ data samples. During the interface processing of an REC, the timing of a CPRI frame (HFN) is of a period of 10/150 ms, and specifically, each HFN includes 150 basic frames and each 150 basic frames occupies a 10-ms period. Therefore, as for the design of a timing relationship between service frame and HFN, a synchronization alignment relationship shall be guaranteed, that is, the starting time of an HFN or that of a basic frame shall be aligned with the starting time of a service frame, thereby attaining the synchronization alignment relationship between service frame and CPRI transmission frame. Furthermore, this synchronization alignment relationship is also periodically iterative due to the attribute of periodical iteration of service frame and CPRI frame. According to an embodiment of the invention, when transferring information at the time of service frame timing and the time of the synchronization alignment, the CPRI may transfer HFN synchronization information and signaling through a sub-channel composed of heads of respective basic frames. In the embodiment of the invention, the HFN synchronization information and the signaling are in accord with those defined in the CPRI. The control channel is a C&M (Control and Management) signaling channel, and may be composed of the control bytes in the heads of the CPRI basic frames, in which channel, control words of its own such as the Comma, the HFN (Hyper Frame Number), the BFN (Basic Frame Number) and the like occupy a part of the capacity of the CPRI control channel. Naturally, other C&M signaling channels transported over the interface may also be applied in variations of the embodiment.

The information with which to configure the REs by means of signaling includes the following two parts:

A rule of arranging M IQ data in N basic frames;

A frame timing relationship that includes a relationship between service frame number and uniform timing signal, and also includes iteration periods of synchronization relationships which involve the iteration period of a synchronization relationship between service frame number and uniform synchronization signal and the iteration period of a synchronization relationship among service frame number, uniform timing signal and basic frame. Thus, the REs may recover service frame timings as well as the M IQ data samples in the N basic frames by means of the uniform timing signal according to those configurations.

For instance, in the case that a service frame timing is 16 and also a starting time of the N basic frames at the time that a next BFN equals to 100, where the iteration period for the synchronization alignment is 1390 BFNs, then the REC may send these information to the REs in advance, and the REs may recover the frame timing, i.e. 16, from the next CPRI frame with the BFN equal to 100, and recover the M IQ data samples from the subsequent N basic frames. Further, based upon the frame timing and the attribute of periodical iteration of the N basic frames, the REs may establish service frame timings and/or recover IQ data, and thereafter, detect whether a failure occurs to this synchronization alignment relationship upon the arrival of the $1390^{th}$ BFN.

In step T34, a sender (an REC or an RE as an example hereinafter) transmits multi-standard radio service data together with the uniform timing information, i.e. the timing information of a common multiple period, over an uplink channel and a downlink channel according to the configured rule of filling IQ data and the frame timing information, and a receiver recovers the frame timing of service frames through the configured frame timing mechanism based upon the uniform timing information, and further recovers the IQ service data through the configured method of mapping IQ containers.

In step T35, the receiver (an RE or an REC as an example hereinafter) recovers the frame timing information on the uplink channel and the downlink channel according to the configured frame timing mechanism and the uniform timing information, where the frame timing information varies from one standard to another, but the transmitted uniform timing information is the same, thus enabling a method for transferring a common frame timing independent of types of the standards.

In step T36, the REC or the RE recovers the multi-standard radio service data over the uplink and the downlink according to the previously designed rule of filling IQ data and the above recovered frame timing information. Since the frame timing information has been recovered for a specific radio service standard in step T35, IQ data may be recovered from a common frame trough the method of mapping IQ containers.

Practically, the uplink channel and the downlink channel relate to the link direction from a User Equipment (UE) to an REC over an RE and the link direction from an REC to a UE over an RE, respectively. Following the above steps, the REC has learned of the method of mapping IQ containers and the frame timing information, with which the REC then configures the RE through the C&M channel, and thus the REC and the RE at the two sides of an uplink channel or a downlink channel may both learn the information necessary for transferring multi-standard radio service frames.

Based upon the above embodiments, a specific implementation of the method of filling IQ data and the frame timing mechanism will be described according to an embodiment of the invention, where a procedure transmission over an uplink channel and an downlink channel may be as following.

The REC fills the IQ data of M service frames into the payload areas of a set of N basic frames according the learned filling method, and indicates in the control sub-channel the frame synchronization information as per a common multiple period.

Then, the RE performs frame synchronization and recovers the downlink IQ data according to the configured information, and then by the same way, transmits the uplink IQ data over the uplink channel after service processing, including the filling and the synchronization.

The REC receives over the uplink channel the information sent from the RE, performs the frame timing and recovers the uplink IQ data.

In the above procedure, the rule of filling IQ data complies with the basic requirement of uniform and alignment filling. According to the corresponding rule of filling IQ data, the REC or RE may uniformly fill IQ data of every M service frames into the payload areas of the N consecutive basic frames of every basic frame according to a fixed method, and make IQ data to be aligned with the time of the frame timing of that basic frame set. In this way, the receiver may obtain the IQ data through a corresponding method.

In the case that an RE is capable of simultaneously supporting numerous standards, the positions of the IQ containers, allocated for IQ data of different standards of the RE, may be separate. The allocation of the bit positions for all IQ containers may hold the same for all basic frames, that is, will not vary with different basic frames.

Additionally, the frame timing information may be used for performing frame timing based upon a common multiple period. The sender may, according to a corresponding frame timing mechanism, perform a frame timing with the use of a common multiple period of a basic frame set as its period. Upon obtaining the frame timing of common multiple period, the receiver may obtain frame timings of respective service frames through counting by the receiver itself.

Figure 4:
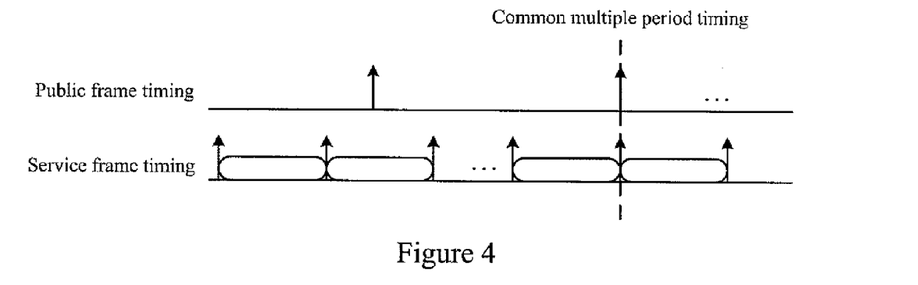
FIG. 4 is a schematic diagram of synchronization alignment between frame timings of different standards and public timing information according to an embodiment of the invention.

The CPRI transmits timing information and signaling through a sub-channel composed of heads of respective basic frames (e.g. a C&M channel), where the information of the signaling is in accord with that defined in the CPRI. According to an embodiment of the invention, the timing information of a CPRI frame is redefined as Public Synchronization Timing Information, which refers to public timing information as commonly referred to by numerous standards, and may be 1 pps (one pulse per second, from a Global Position System or generated by a system clock), and may also be the HFN or BFN as already defined in the CPRI, or other type of timing information capable of providing a public reference for various standards. Since frame timing signals of different standards and the above public synchronization timing information are periodically iterative, they necessarily have a synchronization alignment relationship with respect to a certain public period. Refer to FIG. 4, which schematically illustrates the synchronization alignment of frame timings of different standards with the public timing information.

The public synchronization timing information may be defined in a sub-channel of the CPRI. In the case that the HFN and the BFN are depended on, an original definition of the CPRI still may be used here. In the case that the public synchronization timing information is defined otherwise, the definition of the information may be supplemented based upon the CPRI.

A synchronization relationship of IQ data arrangement shall be satisfied for a method of mapping IQ containers. Since a certain time of synchronization alignment of service frame and CPRI frame also corresponds to the starting time of a certain IQ data sample, the starting time of the N basic frames is also required to be aligned with this synchronization alignment time. The service frame, the CPRI frame, and the N basic frames all have an attribute of periodical iteration, and hence the synchronization alignment time necessarily occurs iteratively at a certain period. Instead of the synchronization alignment time, another fixed time may be employed to be aligned with, e.g., the ending time of each basic frame set.

Further to the above embodiments, a method for transparent transmission between an upper-stage RE and a lower-stage RE in the case of a cascade connection of REs may also be provided according to an embodiment of the invention, that is, a basic frame set may be transmitted between the upper-stage RE and the lower-stage RE via the common radio interface, thereby transferring transparently the IQ data of service frames borne by the upper-stage RE or the lower-stage RE.

In the case of multi-stage cascade connection of REs, the processing of an intermediate-stage RE on data from a lower-stage RE (including uplink data and downlink data) is in accord with that defined in the CPRI V2.0. Note that different REs may comply with the same standard or different standards, which results in different service frame timings, different synchronization alignment relationships, different cycles of N basic frames and different K values in the same basic frame for the different REs. For a simplified processing, to restrict M IQ data to N basic frames, a bit space with the same size may be allocated to each of the N basic frames, so as to facilitate assembling and dissembling of frames in the case of multi-stage cascade connection of REs, that is, K has a fixed value.

During interchanging signaling with each RE, the REC may configure different REs with different synchronization alignment relationships, different service frame timings, different values of N, different values of M, different values of K, and different starting positions of IQ data. Thus, respective REs may perform downlink dissembling by the same way as described above, keeping independent of each other. The lower-stage RE as used here refers to the one among a plurality of REs in cascade connection along a link, which is located relatively further away from the REC.

In the case of a single-stage RE, the principle for uplink frame assembling is the same as that for downlink frame assembling, that is, to utilize the alignment and iterative cycling relationships of a service frame, a CPRI frame and N basic frames. An HFN frame timing carried in an uplink basic frame has a fixed delay relationship with that carried in a downlink basic frame, which is the same as the case defined in the CPRI protocol. In view of this, by utilizing the same principle as that for downlink and based upon the delay relationship between uplink and downlink, a synchronization alignment point may be obtained, and furthermore uplink IQ data may be recovered.

In the embodiment of the invention, positions occupied in the basic frames by the IQ data of multi-stage cascade connection of REs are identical to those in the case of downlink. Assume traffics of uplink and downlink data differ from each other, then the K may take different values which haven't a fixed relationship, and may be determined respectively for uplink and downlink. Uplink data of one RE at a lower-stage next to another RE may be combined with that of the latter RE by the latter RE, which complies with that defined in the CPRI 2.0 protocol.

According to another embodiment of the invention, for simplified processing of the same RE over its uplink channel and downlink channel, a rule of filling IQ data may be configured according to the maximum one of data rates over the uplink channel and the downlink channel of the RE, and then IQ data may be filled and obtained according to the same rule of filling IQ data over the uplink channel and the downlink channel of that RE.

According to an embodiment of the invention, a method for frame synchronization of uplink channel may be provided with respect to uplink and downlink channels. As discussed previously, upon receiving and obtaining the service data over the downlink channel, the RE may perform a processing with a fixed delay, and then transfer the uplink service data over the uplink channel. Thereafter, the REC may recover the frame timing of the service frame received from the uplink channel according to the transmission frame timing of downlink channel, the fixed delay of the RE processing, and the transmission delay between the uplink and downlink channels.

Figure 5:
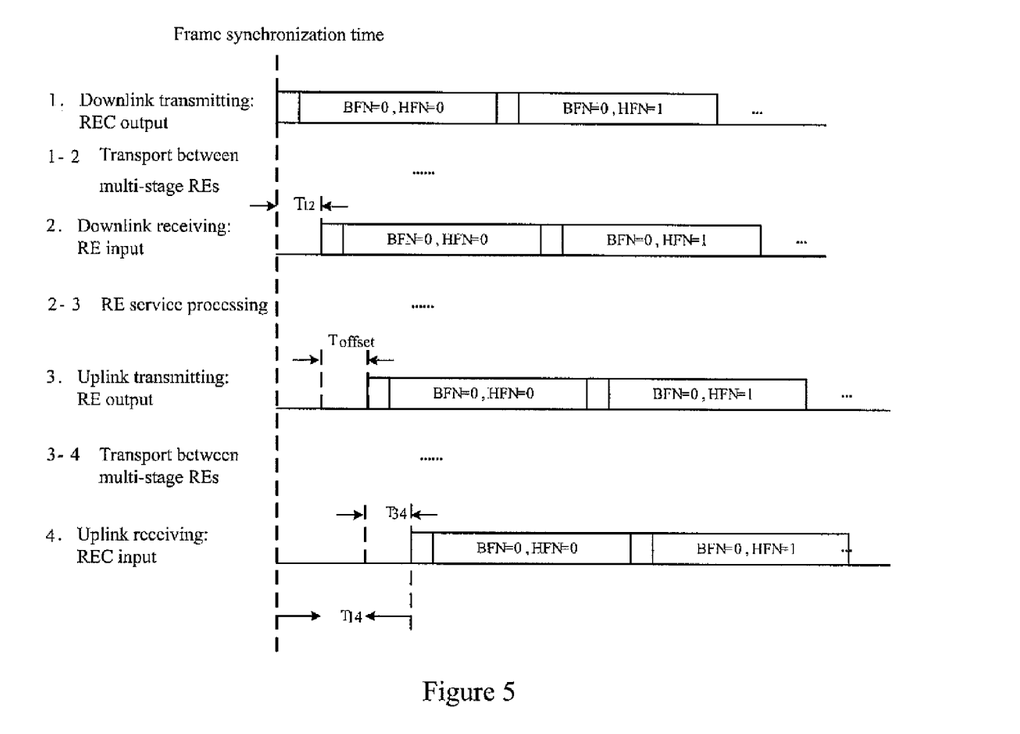
FIG. 5 is a schematic diagram illustrating the principle of frame timing on uplink channel in the method according to an embodiment of the invention.

A method for the REC to obtain a starting position of an uplink "set of N basic frames" will be detailed hereinafter. Refer to FIG. 5, which illustrates the relationship between uplink and downlink frame assembling. A total uplink frame assembling delay of an intermediate-stage RE with respect to a $G^{th}$-stage RE (an RE located nearest to the REC is referred to as the $1^{st}$-stage RE) is $$\sum_{i=1}^{G-1} N^{(i)},$$

where $N^{(i)}$ denotes an uplink frame assembling delay of the $i^{th}$-stage RE with respect to a lower-stage RE next to the $i^{th}$-stage RE.

When transmitting uplink CPRI frames to an upper-stage RE (or REC), an RE may make the relationship between uplink IQ data and the uplink CPRI frames accord with that between the downlink IQ data and downlink CPRI frames received by the RE, that is, there is only a delay of $T_{offset}$ therebetween. Thus, according to the sum of the frame assembling delays of respective intermediate-stage REs and through a method similar to that for an RE to obtain the position information of downlink IQ data, the REC may learn the position information of the uplink IQ data of the RE, including the starting position of the "set of N basic frames".

The descriptions of the above embodiments are described primarily by way of the existing CPRI standard. The filling and bearing of IQ data and the bearing of control channel may be implemented by dividing the payload area and the control channel area of a CPRI basic frame, respectively. In view of a future development, the uniform transmission of multi-standard service frames may also be realized by employing the inventive concept and method of the invention, together with a new designed common radio interface.

Figure 6:
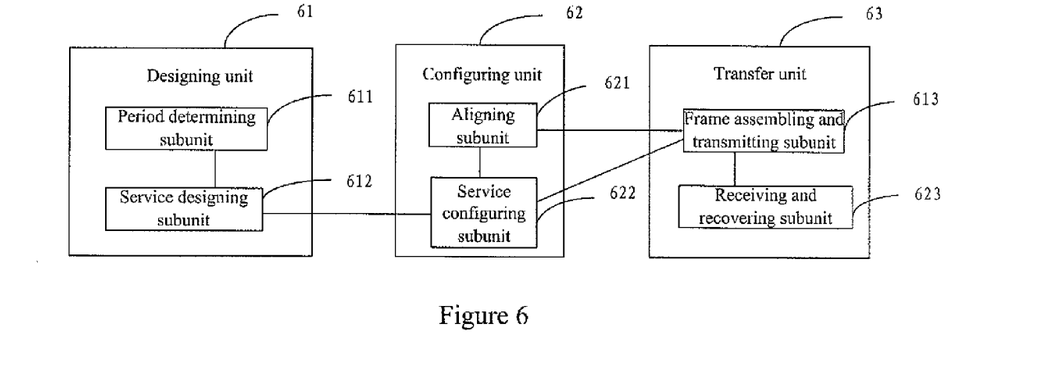
FIG. 6 is a schematic structural diagram of a device for transferring multi-standard radio service data according to an embodiment of the invention.

Refer to FIG. 6, which illustrates a schematic diagram of a device for transferring multi-standard radio service data according to an embodiment of the invention. The device includes a designing unit 61, a configuring unit 62 and a transfer unit 63. Particularly, the designing unit 61 is adapted to design a radio service frame timing mechanism and/or a rule of filling IQ data for a plurality of standards. The rule of filling IQ includes filling the IQ data of every M service frames into the payload areas of the N basic frames of every basic frame set in a fixed way and making the IQ data aligned with the frame timing of the basic frame set. The configuring unit 62 is connected with the designing unit 61, and adapted to configure corresponding frame timing information and/or methods of mapping IQ containers for various services according to the radio service frame timing mechanism and/or the rule of filling IQ data for a plurality of standards designed by the designing unit 61. The transfer unit 63 is connected with the configuring unit 62, and adapted to transmit multi-standard radio service data according to the corresponding frame timing information and/or the methods of mapping IQ containers configured by the configuring unit 62 for various services.

The designing unit 61 includes a period determining subunit 611 and a service designing subunit 612. Particularly, the period determining subunit 611 is adapted to determine uniform timing information, i.e. a common multiple period which may be determined according to a common multiple relationship between a length of a basic frame and that of a service frame of a common radio interface so as to be an integer (N) multiple of the length of the basic frame and an integer (M) multiple of that of the service frame. The service designing subunit 612 is adapted to design the radio service frame timing mechanism for a plurality of standards according to the common multiple period determined by the period determining subunit 611, and design the rule of filling IQ data by taking every N basic frames as a basic frame set to bear the IQ data of the M service frames.

The configuring unit 62 includes a service configuring subunit 622 and an aligning subunit 621. Particularly, the service configuring subunit 622 is connected with the service designing subunit 612, and adapted to configure the frame timing information and/or the methods of mapping IQ containers in sets of basic frames for the IQ data of the radio service frames corresponding to the various services, according to the uniform timing information, by means of signaling or control words, through a control channel of the common radio interface. That is, a radio equipment controller may configure the frame timing information and/or methods of mapping IQ containers for various services of the radio equipment, according to the frame timing mechanism and/or the rule of filling IQ data designed by the service designing unit 612 as well as a corresponding demand for service processing, by means of signaling or control words, through a control channel of the common radio interface. The aligning subunit 621 is connected with the service configuring subunit 622, and adapted to fill IQ data for various services of the radio equipment, and then align the IQ data with the uniform timing information.

The transfer unit 63 includes a frame assembling and transmitting subunit 631 and a receiving and recovering subunit 632. Particularly, the frame assembling and transmitting subunit 631 is connected respectively with the service configuring subunit 622 and the aligning subunit 621, and adapted to transmit uniform timing information, and to assemble and transmit service frames filled with IQ data according to the configured frame timing information and/or method of mapping IQ containers and transmit the assembled frames. The receiving and recovering subunit 632 is adapted to recover respectively the uniform timing information, the frame timing information and/or method of mapping IQ containers received from the frame assembling and transmitting unit 631, thereby obtaining the frame timing information and radio service data for radio services.

Specific functions and purposes of the respective units and subunits in the device may be understood with reference to the previous descriptions of the respective steps of the method according to the embodiments of the invention, and descriptions thereof will not be repeated here.

Furthermore, the embodiments of the invention are applicable not only to a radio equipment, a radio network equipment but also to any other electronic equipment capable of transferring multi-rate and multi-timing radio data.

In the embodiments of the invention, based upon frame timing information and/or methods of mapping IQ containers as configured uniformly, the sender may fill frame timing information and/or IQ data and thus construct common frames; accordingly, the receiver may perform frame synchronization and parse the frames to obtain the IQ data according to the same mechanism. For different standards of radio data, a common multiple (e.g. a lowest common multiple) relationship of the length of a common frame and a standard period may be used to determine a common multiple period. The common multiple period is used as a unit in which to load and transmit the data as well as used for enabling frame timing. The receiver may enable synchronization of all the data frames through a standard period counter. Subsequent to the transmission, the REC may enable synchronization of frames on uplink channel according to prior knowledge of a processing delay of the RE, thereby achieving uniform transmission and frame synchronization of multi-standard IQ data on downlink channel.

Practically, the REC may configure a frame timing (synchronization) mechanism and/or a rule of filling IQ data through signaling, and upon transmission, first transmit uniform timing information (signal) and then fill IQ data. Upon reception, the RE may recover frame timing information corresponding to the RE itself by means of the uniform timing information according to the configured frame timing mechanism, and then obtain the IQ data according to the rule of filling IQ data or synchronization alignment relationship. As for uplink channel, the REC may recover a frame timing (for synchronization) based upon a fixed delay. Here, the frame timing mechanism refers to how to recover the frame timing information for a specific standard with reference to the uniform timing information, and the rule of filling IQ data refers to how to align with the uniform timing information, how to fill IQ data, etc.

As a result, the embodiments of the invention may realize the transfer of various standards of radio IQ data through uniform configurations, so that a common interface independent of a specific standard may be provided with an enhanced compatibility, an improved flexibility of radio transmission and a simplified radio interface transmission mechanism. The embodiments of the invention also may implement the mapping of IQ containers and the frame synchronization mechanism in unit of a common multiple period, and thus the existing CPRI may be extended to a common interface applicable to simultaneous transmission of multi-standard radio data, which may meet the demand for technology advancements and facilitate the popularization of radio communications. The embodiments of the invention further may provide a method for mapping different standards of IQ data into IQ containers of the common interface and a method for synchronizing uplink and downlink channels, and thus enable the common interface to transmit data at any standard rate. Thus, the CPRI standard may be extended to support other various standards, thereby greatly enhancing the universality of the existing CPRI.

Those skilled in the art may appreciate that the descriptions of technical particulars in the above embodiments have been presented by examples of some universal application scenarios, with providing some parameters configured specifically, and so on. However, in order to better attain the objects of the invention, the parameters may be configured flexibly as required in a practical application without departing from the essence and scope of the invention.

The present invention has been described and illustrated with reference to the embodiments thereof and the drawings. It shall be obvious to those skilled in the art that those embodiments and drawings are merely illustrative and not restrictive, that the present invention shall not be limited the embodiments disclosed here, and that various modifications and variations may be made thereto in light of the descriptions and the drawings without departing from the spirit and scope of the present invention as defined in the accompanying claims.

What is claimed is:

1. A method for transferring multi-standard radio Service data, comprising:
    designing a radio service frame timing mechanism and a rule of filling In-phase/Quadrature (IQ) data for a plurality of wireless communication standards;
    configuring frame timing information and methods of mapping IQ containers corresponding to a plurality of radio services, according to the designed, radio service frame timing mechanism and the rule of filling IQ data for the plurality of wireless communication standards, by means of signaling or control words, through a control channel of a Common Public Radio Interface (CPRI); and
    transferring multi-standard radio service data according to the configured frame timing information and the methods of mapping IQ containers corresponding to the plurality of radio services;
    wherein the designing of the radio service frame timing mechanism and the rule of filling IQ data comprises:
    determining uniform timing information which is a common multiple period equal to an integer N multiple of the length of a basic frame of the CPRI and an integer M multiple of the length of a radio service frame;
    designing the radio service frame timing mechanism to achieve synchronization alignment between the radio service frame and the basic frame of the CPRI, according to the common multiple period; and
    designing the rule of filling IQ data by taking consecutive N basic frames as a basic frame set to bear the IQ data of every M radio service frames with each basic frame set, according to the common multiple period;
    wherein the transferring multi-standard radio service data comprises:
    transmitting, by a sender, the uniform timing information, and assembling and transmitting the multi-standard radio service data according to the configured frame timing information and the method of mapping IQ containers; and
    recovering, by a receiver, respectively the received uniform timing information, frame timing information and IQ data, and obtaining frame timing information and frame data of the radio service frames; and
    wherein the transferring multi-standard radio service data further comprising: when applying a cascade connection of radio equipments, transparently transferring, between an upper-stage radio equipment and a lower-stage radio equipment or between a radio equipment and a radio equipment controller, IQ data of the radio service frames borne by the radio equipments or the radio equipment controllers by transferring basic frame sets via the CPRI.

2. The method for transferring multi-standard radio service data according to claim 1, wherein the common multiple period is a lowest common multiple of the length of the basic frame and the length of the radio service frame.

3. The method for transferring multi-standard radio service data according to claim 1, wherein the configuring of frame timing information and methods of mapping IQ containers corresponding to the plurality of radio services comprises:
    configuring the frame timing information and the methods of mapping IQ containers in the basic frame set for the IQ data of the radio service frames corresponding to the plurality of radio services, according to the uniform timing information, a processing demand and a predefined condition of a radio equipment or the
    uniform timing information, a processing demand and a predefined condition of the plurality of radio services.

4. The method for transferring multi-standard radio service data according to claim 1, further comprising:
    filling, by the sender, IQ data of every M radio service frames into the payload areas of the N basic frames of every basic frame set in a fixed way according to the corresponding method of mapping IQ containers, and aligning the IQ data with the frame timing information of that basic frame set; and
    obtaining, by the receiver, the IQ data in a corresponding way.

5. The method for transferring multi-standard radio service data according to claim 4, further comprising:
enabling, by the sender, a frame timing with a common multiple period of the basic frame set as the period for the frame timing, according to the corresponding frame timing information; and
obtaining, by the receiver, the frame timing of the common multiple period, and
obtaining frame timing information for each radio service frame through counting by the receiver itself.

6. The method for transferring multi-standard radio service data according to claim 1, further comprising:
designing the rule of filling IQ data according to the maximum one of data rates over uplink and downlink channels of the radio equipments, and filling and obtaining the IQ data according to the designed rule of filling IQ data.

7. The method for transferring multi-standard radio service data according to claim 6, further comprising:
obtaining, by any of the radio equipments, service data over the downlink channel, performing a processing with a fixed delay on the service data, and transmitting the uplink service data over the uplink channel; and
recovering, by any of the radio equipment controllers, frame timing information of the radio service frames received over the uplink channel according to the timing information of the frames transmitted over the downlink channel, the fixed delay of the processing, and a transmission delay of the uplink channel and the downlink channel.

8. The method for transferring multi-standard radio service data according to claim 1, wherein the bearing and filling of the IQ data and bearing of the control channel are implemented by dividing a basic frame of the Common Public Radio Interface into a payload area and a control channel area, respectively.

9. A device for transferring multi-standard radio service data, comprising:
a designing unit, configured to design a radio service frame timing mechanism and a rule of filling IQ data for a plurality of wireless communication standards;
a configuring unit, configured to configure frame timing information and methods of mapping IQ containers corresponding to a plurality of radio services, according to the radio service frame timing mechanism and the rule of filling IQ data for the plurality of wireless communication standards designed by the designing unit, by means of signaling or control words, through a control channel of a Common Public Radio Interface (CPRI); and
a transfer unit, configured to transfer multi-standard radio service data according to the frame timing information and the methods of mapping IQ containers corresponding to the plurality of radio services, configured by the configuring unit;
wherein the designing unit comprises:
a period determining subunit configured to determine uniform timing information, which is a common multiple period; wherein the period determining subunit determines the common multiple period according to a common multiple relationship of a length of a basic frame of the CPRI and a length of a radio service frame such that the common multiple period is an integer N multiple of the length of the basic frame and an integer M multiple of the length of the radio service frame; and
a service designing subunit connected with the period determining subunit and configured to design the radio service frame timing mechanism to achieve synchronization alignment between the radio service frame and the basic frame of the CPRI, according to the common multiple period, and to design the rule of filling IQ data by taking N consecutive basic frames as a basic frame set and
bearing IQ data of every M radio service frames with each basic frame set;
wherein the transfer unit comprises:
a frame assembling and transmitting subunit, connected respectively with the service configuring subunit and the aligning subunit and configured to transmit the uniform timing information, and to assemble and transmit the radio service frames filled with the IQ data according to the configured frame timing information and method of mapping IQ containers; and
a receiving and recovering subunit, connected with the frame assembling and transmitting subunit and configured to recover respectively the uniform timing information, the frame timing information and the IQ data received from the frame assembling and transmitting unit, and to obtain frame timing information and radio service data for the radio services.

10. The device for transferring multi-standard radio service data according to claim 9, wherein the configuring unit comprises:
a service configuring subunit, connected with the service designing subunit and configured to configure the frame timing information and the methods of mapping IQ containers in the basic frame set for IQ data of the radio service frames corresponding to the plurality of radio services, according to the uniform timing and
an aligning subunit, connected with the service configuring subunit and configured to fill the IQ data of the radio service frames corresponding to the plurality of radio services into the basic frames, and then to align the basic frames with the uniform timing information.

* * * * *